June 3, 1969  Z. R. BOYD  3,447,632
FOLDING LADDER
Filed Feb. 20, 1968

INVENTOR.
ZANE R. BOYD
BY Hubert Miller
ATTORNEY

United States Patent Office 3,447,632
Patented June 3, 1969

3,447,632
FOLDING LADDER
Zane R. Boyd, 9717 Par Lane,
Wichita, Kans. 67212
Filed Feb. 20, 1968, Ser. No. 706,962
Int. Cl. E06c 1/39
U.S. Cl. 182—116           10 Claims

ABSTRACT OF THE DISCLOSURE

The invention is a three-legged collapsible stepladder which can be stored in a limited space having a releasable cross step connecting two of the legs in a rigid relation. Each of the legs being pivotally mounted to a platform, are made up of upper and lower sections pivoted together by a joint which also allows the sections to move relative to each other in a telescoping manner when fully extended, to a position locking the joint against pivotal movement.

---

This invention was primarily designed as an aircraft accessory for assisting the private pilot of a high wing aircraft in visually checking the amount of fuel in the tanks and the filler caps. Sole reliance upon the cockpit fuel gages prior to leaving the ground is an unsafe practice and should be confirmed by a visual inspection during a preflight check of the aircraft. With a low wing aircraft, a visual inspection is easily performed but with a high wing craft some type of ladder is necessary to obtain access to the top of the wing where the gas filler caps are located. At a home airport a pilot usually has some type of ladder available, but in most situations he will not go to the trouble to use it due to its large size or proximity to the plane. At many small airports where planes stop to refuel there are no provisions at all to check and see if the attendant has filled the tanks and properly fastened the gas filler cap. The end result is that the pilot takes off without the visual check, assuming he has gas onboard to carry him a certain distance.

The present invention has attempted to remedy this possibility of error by providing a small, lightweight, foldable ladder that is always carried in the plane. The ladder in its open position has three legs, spread like a tripod, with a standing platform at their juncture. The only step between the ground and the platform is a cross brace which connects two of the legs at their respective midpoints. The two sections of each foldable leg are provided with a lockable pivot joint which only allows the legs to be folded when the lower section is pulled outward in a telescoping manner against a tension spring. Due to its three wide spread legs, the ladder provides a stable independent base for a person to stand on regardless of how uneven the ground might be. When in its folded state, the present invention occupies roughly 10% of the space that a conventional stepladder would fill.

It is therefore the primary objective of the present invention to provide a lightweight foldable stepladder to be carried as an accessory in a small aircraft.

It is a further object to provide a new and improved lock joint for the folding leg sections of a collapsible ladder.

The invention and its various objects and advantages will be more clearly understood when the following description is read in connection with the accompanying drawings in which.

Figure 1:
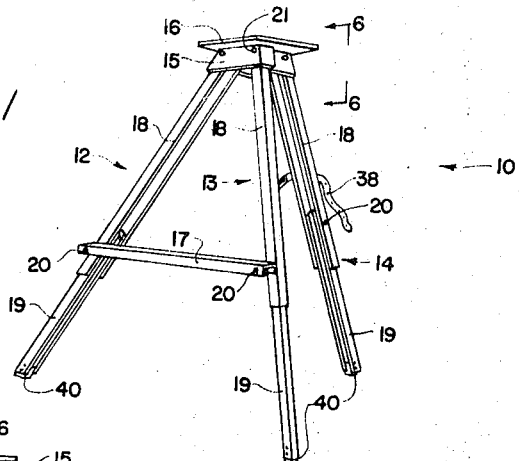
FIG. 1 is a perspective view of the stepladder in its open position ready for use.

Referring to the drawings for a more detailed description of the invention, and more specifically to FIG. 1, a stepladder is generally identified by reference numeral 10. The ladder 10 has three legs 12, 13 and 14 which are pivotally attached to platform 16 through a mounting bracket 15. When the ladder is in the open position as viewed in this figure, the legs are positioned like a tripod with the front two legs 12 and 13 rigidly positioned by a cross brace 17. The cross brace 17 and platform 16 provide the stepping surfaces for the user. Each of the legs 12, 13 and 14 includes upper and lower sections 18 and 19 respectively, each having a channel shaped cross section. The two sections are connected by a pivot pin 20 which permits the lower section 19, with a smaller width dimension, to fold into the upper section 18 as will be further described with reference to FIGS. 4 and 5. Located on the free ends of the lower sections are nonslip feet 40.

FIGURE 6

Attached to the underside of platform 16 is a mounting bracket 15 shown in section in this figure. Each of the upper leg sections 18 are pivotally connected to the bracket 15 by pivot pins 21. The wall portion 22 of the bracket 15 limits the outward pivotal movement of the legs biased by springs 23.

FIGURES 4 AND 5

Figure 4:
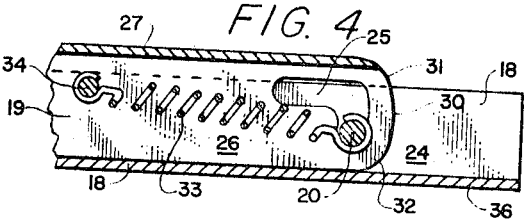
FIG. 4 is a view to an enlarged scale showing the fragmentary longitudinal section of the locking joint with the lower leg section folded inside the upper section.
Figure 5:
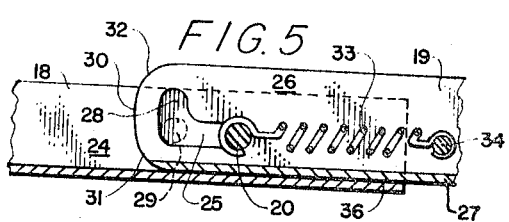
FIG. 5 is a similar view to FIG. 4 with the lower leg section locked in the extended position.

In FIGS. 4 and 5 the locking joint which connects the two leg sections is shown with the sections folded (FIG. 4) and with the sections extended (FIG. 5). Pivot pin 20 passes traversely through the side walls 24 of the upper section and the longitudinally extending slot 25 of the lower section 19 thereby permitting the lower section to slide longitudinally in the upper section the length of the slot 25 when in parallel spaced relation. The slot 25 is offset from the longitudinal center line of the lower section 19 toward the web portion 27, to prevent the lower section 19 from sliding in groove 25 when in the folded FIG. 4 position. The side walls 26 of the lower section terminate in an arcuate surface 30 having two curved portions 31 and 32. The first curved portion 31 is concentric with the end portion 29 of the slot 25 while the second curved portion 32 is concentric with the offset portion 28 of the slot. Attached to pin 20 is a tension spring 33 which is anchored to the lower section 19 by pin 34.

Figure 2:
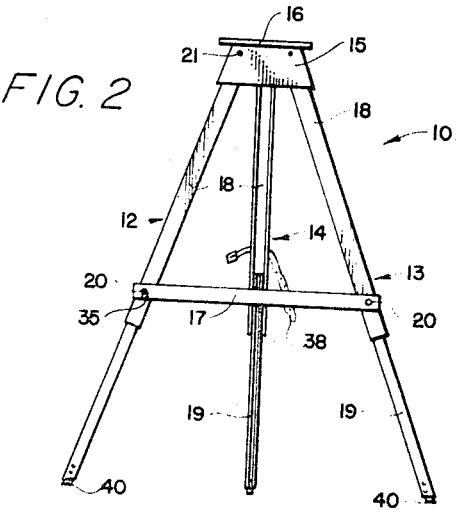
FIG. 2 is a front elevational view of the ladder in the open position.

The pivot pins 20 on the front legs 12 and 13 extend outwardly to additionally provide a mounting means for cross brace 17, as seen in FIGS. 1 and 2. The brace 17 is pivotally attached to leg 13 while the groove 35 in the opposite end of the brace slidably engages the outwardly extending portion of pin 20 in leg 12.

OPERATION

Figure 3:
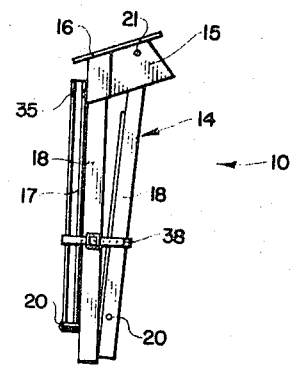
FIG. 3 is a side elevational view of the ladder in the folded position.
Figure 6:
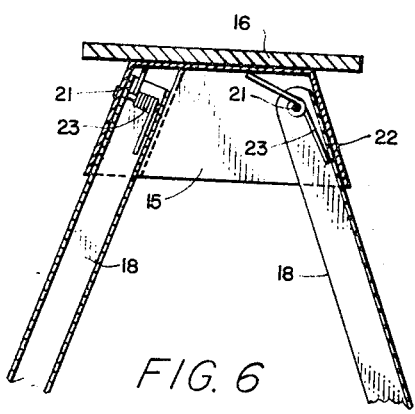
FIG. 6 is a fragmentary sectional view taken along line 6—6 of FIG. 1.

The ladder 10 is illustrated in its open position with the legs extended in FIG. 1 and its folded condition in FIG. 3. To unfold the ladder from its FIG. 3 position, the strap 38 is released allowing the legs to spread by the action of springs 23 (FIG. 6). The legs 12, 13 and 14 will spread until they contact wall 22 of the mounting bracket 15. Each of the lower leg sections 19, prior to the unfolding, are located within the side walls 24 of the upper leg section 18 as seen in FIG. 4. The free end of the lower leg section 19 is pulled outward, rotating about pin 20.

When the lower section approaches the fully extended position, the spring 33 will cause pivot pin 20 to move inward in slot 25 to the FIG. 5 position. In this position the upper and lower sections are locked against any relative rotation. By the movement of pin 20 in slot 25, the effective center of rotation of the lower section is shifted inward and the outer end 30 of the lower section will come in contact with the web 36 of the upper section, preventing any rotation. The lower section 19 cannot be folded again until it is pulled outward in a telescoping manner overcoming spring 33. When the pin reaches the dotted line position 29 at the end of the slot, the lower section is again free to rotate, since the center of rotation is now concentric with the curved portion 31 of the arcuate end surface 30.

In returning the lower section 19 to the folded position, the pin 20 is forced from dotted line position 29 into the offset portion of the slot 28, as seen in FIG. 4, due to the camming action created between the arcuate surface 30 and the web 36. The curved portion 31 has a different center of rotation than the curved portion 32. Therefore, as portion 32 comes in contact with the web 36, during rotation, the pin 20 is forced to the offset portion 28 of the slot, which is concentric with curved portion 32. If pin 20 was not forced to the offset portion 28, it would ride back in slot 25 under the action of spring 33 when the lower section was completely folded. It would be undesirable to lock the sections from rotation when they are folded because of the difficulty encountered in unlocking them. As previously mentioned, to unlock the sections the lower section 19 must be pulled outward in telescoping relation the length of groove 25 against the spring 33. When the sections are folded it would be very difficult to grip and slide the lower section which is surrounded by the upper section. For this reason the slot 25 is offset from the longitudinal center axis of lower section 19.

Once the lower leg sections 19 have been extended and locked, the cross brace 17 is rotated into horizontal position engaging pin 20 of leg 12 in groove 35. With brace 17 so positioned, it provides a step as well as a means to rigidly space the two front legs 12 and 13.

In folding the ladder the brace 17 is rotated upward into parallel relation with leg 13. The lower leg sections 19 are individually pulled downward and rotated into folding relation wtih the upper sections. The folded sections are then brought together and held by strap 38 as viewed in FIG. 3.

Having described the invention with sufficient clarity to enable those familiar with the art to construct and use it, I claim:

1. A lock joint structure for a folding leg or the like comprising:
    an upper section having a channel shaped cross section with opposing side walls joined by a web;
    a lower section positioned inside the upper section in flush relation with the web of the upper section, having side walls terminating at one end in an arcuate end surface;
    a transverse slot in the side walls of the lower section extending longitudinally outward on the lower section to its outer end which is substantially concentric with the arcuate end surface, an offset slot portion extending laterally from the outer end;
    pivot means for joining the two sections anchored to the side walls of the upper section and extending through the slot in the lower section allowing pivotal movement between the sections from an extended position to a folded position only when the pivot means is positioned proximate the outer end of the slot; and
    spring means connected to the lower section urging the pivot means away from the outer end of the slot whereby the lower section when in the extended position will slide longitudinally in the upper section to lock the sections from any pivotal movement relative to each other.

2. A lock joint structure as set forth in claim 1 wherein the longitudinally extending slot is positioned to one side of the longitudinal center line of the side walls with the offset portion extending across the center line to the opposite side, the arcuate end surface of the lower section has a first curved portion concentric with the outer end of the slot, and a second curved portion concentric with the offset portion of the slot.

3. A lock joint structure as set forth in claim 1 wherein the longitudinal extending slot is positioned to one side of the longitudinal center line of the section with the offset portion extending across the center line to the opposite side, the arcuate end surface of the lower section having a first curved portion concentric with the outer end of the slot and a second curved portion concentric with the offset portion of the slot, the curved portions coacting with the web of the upper section in a camming action to force the pivot means into the offset portion when the lower section is folded into the upper section.

4. A folding stepladder collapsible into a relatively small size comprising:
    a platform member;
    at least three folding legs pivotally connected to the platform in a tripod configuration, each leg having upper and lower sections, the upper section having a channel shaped cross section with opposing side walls joined by a web, the lower section positioned inside the upper section having an arcuate shaped end surface, a traverse slot in the lower section extending longitudinally outward on the section to its outer end which is substantially concentric with the arcuate end surface;
    pivot means for joining the two sections, anchored to the side walls of the upper section and extending through the slot in the lower section allowing pivotal movement between the sections from an extended position to a folded position only when the pivot means is positioned at the outer end of the slot;
    spring means connected to the lower section urging the pivot means away from the outer end of the slot whereby the lower section when in the extended position will slide longitudinally in the upper section to lock the sections from any pivotal movement relative to each other; and
    a cross brace step member releasably connecting the first and second legs in rigid spread relation.

5. A folding stepladder as set forth in claim 4 wherein the longitudinally extending slot has an offset portion extending laterally from the outer end for receiving the pivot means when the sections are in the folded position.

6. A folding stepladder as set forth in claim 4 wherein the longitudinal extending slot is positioned to one side of the longitudinal center line of the section, an offset portion extending from the outer end of the slot laterally across the center line to the opposite side, the arcuate end surface of the lower section having a first curved portion concentric with the outer end of the slot and a second curved portion concentric with the offset portion, whereby the curved portions coact with the web of the upper section in a camming action to force the pivot means into the offset portion.

7. A folding stepladder as set forth in claim 4 wherein the platform member includes a bracket means which provides a pivotal mounting for the three legs limiting their outward pivotal movement.

8. A folding stepladder as set forth in claim 4 wherein the platform member includes a bracket means which provides a pivotal mounting for the legs limiting their outward pivotal movement, the first and second legs pivoting in a common plane while the third leg pivots in a plane normal to the plane of the first and second legs.

9. A folding stepladder as set forth in claim 4 wherein the platform member includes a bracket means which provides a pivotal mounting for the three legs limiting the outward pivotal movement and spring means attached to the bracket means biasing the legs outward against the limits of the bracket means.

10. A folding stepladder as set forth in claim 4 wherein the platform member includes a bracket mean which provides a pivotal mounting for the three legs limiting the outward pivotal movement and spring means attached to the bracket means biasing the legs outward against the limits of the bracket means, the cross brace member being pivotally connected at one end to the first leg and releasably connected at the other end to the second leg so that when in the folded position the cross brace lies in side-by-side juxtaposed relation with the upper section of the first leg.

References Cited

UNITED STATES PATENTS

| | | | |
|---|---|---|---|
| 184,395 | 11/1876 | Lofland | 182—163 |
| 1,442,694 | 1/1923 | Martin | 182—169 |
| 1,723,938 | 8/1929 | Ireland | 182—163 |

REINALDO P. MACHADO, *Primary Examiner.*

U.S. Cl. X.R.

182—169, 163